United States Patent [19]
Dowling et al.

[11] 3,896,413
[45] July 22, 1975

[54] PERMEABILITY LOGGING METHOD USING APPARATUS COMPRISING CURRENT ELECTRODES BETWEEN ELECTROMAGNETS, CURRENT ELECTRODE ON THE SURFACE AND ACOUSTIC LISTENING DEVICES TO DETECT PRESSURE RELATED NOISE

[75] Inventors: Donald J. Dowling; John F. Boyd, both of Houston, Tex.

[73] Assignee: Texaco Inc., New York, N.Y.

[22] Filed: Jan. 28, 1974

[21] Appl. No.: 437,089

[52] U.S. Cl............ 340/15.5 BH; 340/17; 181/104; 181/108; 181/139
[51] Int. Cl. .......................... G01v 1/40; G01v 3/08
[58] Field of Search............340/15.5 BH, 15.5 A, 340/17; 181/104, 108, 120, 139; 73/155; 324/9, 10

[56] References Cited
UNITED STATES PATENTS
| | | | |
|---|---|---|---|
| 2,433,746 | 12/1947 | Doll | 324/10 |
| 2,814,017 | 11/1957 | Doll | 324/10 |
| 3,599,085 | 8/1971 | Semmelink | 324/10 |

Primary Examiner—Maynard R. Wilbur
Assistant Examiner—N. Moskowitz
Attorney, Agent, or Firm—T. H. Whaley; C. G. Ries; William J. Beard

[57] ABSTRACT

A method and apparatus which describe a technique for measuring formation porosity in a formation adjacent to a wellbore. A sonde is lowered to a desired depth in a well adjacent to a formation of interest. The sonde includes magentic poles which form lines of flux in the formation. Intermediate of the magnetic poles is a current electrode. A return path for the current electrode is completed preferably at the surface. The current flow path in the formation from the current electrode is approximately perpendicular to the magnetic flux lines. The two fields impinge on fluids located in the interstices of the formation, creating localized pressure which is relieved by fluid flow in the formation. The fluid flow is accompanied by noise created by the fluid interacting with the formation which defines many serpentine and erratic flow paths. The noise is heard by a wide band acoustic listening device. The noise is related to a permeability of the formation.

14 Claims, 1 Drawing Figure

PERMEABILITY LOGGING METHOD USING APPARATUS COMPRISING CURRENT ELECTRODES BETWEEN ELECTROMAGNETS, CURRENT ELECTRODE ON THE SURFACE AND ACOUSTIC LISTENING DEVICES TO DETECT PRESSURE RELATED NOISE

PRIOR ART

U.S. Pat. No. 3,601,788.

BACKGROUND OF THE INVENTION

Oil and gas wells are hopefully drilled into formations having high permeability. Petroleum deposits can more likely be recovered from a formation which has a high measure of permeability. Permeability is a function of the materials which comprise the formation. For instance, a formation might be formed of many small sand particles which are irregular in size and shape. They define interstices between particles which are open to fluid flow. The interstices are irregular in size, shape and direction. In a given volume of a formation, the interstices provide a volume for accumulation of petroleum fluids. When a well is drilled into the formation, fluid flows towards the well which reduces pressure in that portion of the formation. The fluid flow in the formation is dependent on the permeability of the formation, or the ability of the fluid to migrate through the interstical spaces.

The interstices in the formation may be likened to a tortuous or a serpentine capillary of irregular cross-section size and shape. Fluid flow through such a capillary or conduit is accompanied by noise. The noise arises from movement of the fluid past the walls of the capillary or conduit which create noise as a result of the lack of smoothness and uniform diameter. As a consequence of this, noise in a specified frequency band is created.

The method and apparatus of the present invention takes advantage of the acoustic noise created by the fluid flow in the interstical space in a formation. The noise created by the fluid flow is picked up by an acoustic listening device, amplified and recorded. The method and apparatus further contemplates means for creating localized fluid flow in the formation of interest. The apparatus incorporates north and south poles of a magnet which form magnetic flux lines in the formation. A current injection electrode forms a current flow path through the formation which is approximately perpendicular to the magnetic lines of flux. The two fields interact with the fluid in the formation to agitate the fluid, causing it to move in the capillaries in the formation. The movement creates the noise which is detected by the acoustic listening device.

SUMMARY OF THE INVENTION

The present invention incorporates a sonde having a decentralizing spring which forces electrodes and poles into intimate contact with a side wall of a bore hole adjacent to a formation of interest. A central electrode is provided which is a current injection electrode. A complete circuit is completed by placing a ground electrode at the well head or elsewhere. The apparatus further includes north and south poles of a magnet. They form magnetic flux lines in the formation which are approximately perpndicular to the current flow lines in the formation. The two fields interact with the formation fluids to force them to move, creating noise which is detected by a listening device and which is amplified to provide a measure of formation permeability.

DESCRIPTION OF THE DRAWINGS

The single drawing discloses an apparatus in a well bore for practice of the present invention, the apparatus incorporating a sonde which is lowered on a cable to position a magnet for forming magnetic flux lines in the formation and additionally for forming current in the formation flowing approximately perpindicular to the magnetic flux lines.

DESCRIPTION OF THE PREFERRED EMBODIMENT

Figure 1:
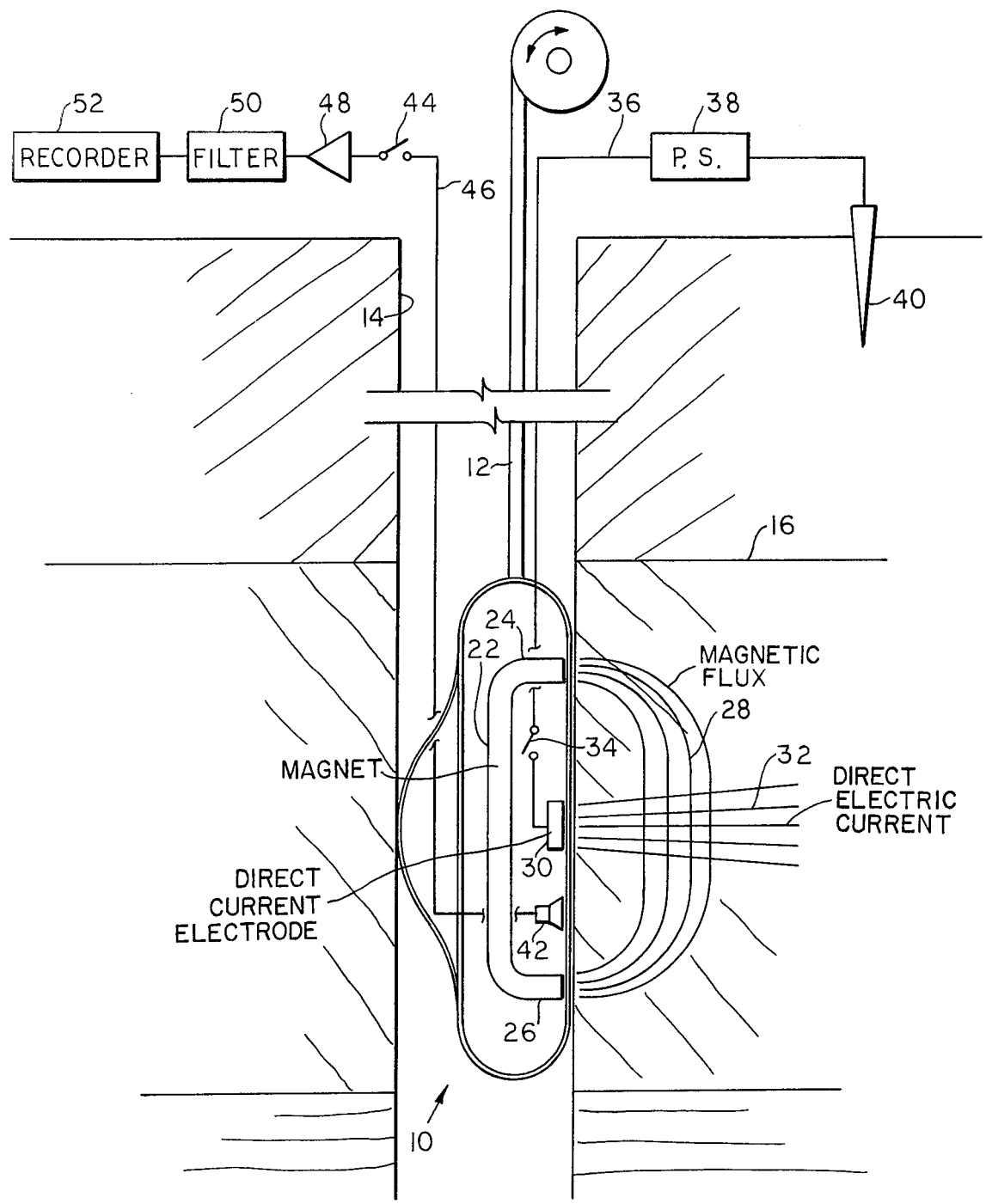

In the single drawing, a sonde 10 is shown on a cable 12 in a well bore 14 adjacent to a formation of interest 16. The apparatus provides a measure of the permeability of the formation 16. The cable 12 extends to a drum 18 at the surface which is rotated to raise or lower the sonde 10 in the well. The cable 12 suspends the sonde in the well. The sonde is pushed to one side by a decentralizing spring 20. The spring 20 forces the sonde against the formation 16 and contacts certain terminals or electrodes against the formation to obtain better contact.

The sonde 10 incorporates a magnet 22 which includes a south pole 24 and a north pole 26. The poles 24 and 26 are on the wall of the sonde and adapted to be contacted directly against the adjacent formations. The magnet 22 is a powerful magnet which forms magnetic lines of flux in the formation. The numeral 28 identifies a typical flux line which extends approximately parallel to the bore hole 14 adjacent to the sonde in the formation. The flux lines pass through the formation of interest. The flux lines, of course, have a length determined by the spacing of the poles 24 and 26. The magnet 22 is substantially powerful, and may be by way of example an electromagnet.

The apparatus further includes an electrode 30, which is a current injection electrode. Current flow lines such as the path 32 are formed in the formation. A complete circuit for the current injection electrode is provided. The electrode 30 is connected by means of a switch 34 to a conductor 36 which extends to a power supply 38. The power supply 38 is also connected to a return electrode 40. The return electrode may take any form. One suitable form is a ground stake which is driven into the surface adjacent to the formation. The return electrode 40 may also be located on the cable 36 some distance above the sonde 10. It is helpful to locate the two electrodes relative to the well 14 such that the current flow, at least in the near vicinity of the sonde 10, is approximately perpendicular to the magnetic lines of flux. The relative length of the magnetic flux path 28 is measured in only centimeters while the electric current flow path 32 may measure several thousand meters. With these relative scale factors in view, it will be appreciated and understood that the intersection of the proposed field lines 28 and 32 is not precisely perpendicular.

The apparatus further includes a listening device 42 which is connected through a switch 44 by means of a conductor 46 extending to an amplifier 48. A filter 50 for selecting frequencies of interest is connected in the system. The amplified signal is recorded by means of a recorder 52.

The apparatus functions in the following manner to obtain a measure of formation permeability. The sonde 10 is lowered to a point adjacent to the formation 16 of interest. The magnet 22 forms flux lines in the formation. They will penetrate only a few centimeters deep into the formation but when the magnetic poles 24 and 26 are positioned against the side of the well, the flux lines are formed in the formation. The flux lines at the central portions are approximately parallel to the well bore 14. The switch 34 is closed, completing an electric circuit between the electrodes 30 and 40. The electrode 30 establishes a flow path in the formation 16. The current flow path is approximately perpendicular to the magnetic flux lines in the formation.

The two fields interact with fluids in the formation. The two fields create localized increases in pressure in formation fluids, forcing the fluid to flow in a random direction and with random velocities. The fluid is captive in the interstical spaces of the formation. The spaces form randomly oriented, randomly shaped serpentine capillaries or conduits. It is not particularly important which way the fluid will flow. The significant thing is that the fluid tends to flow, even microscopically, to interact with the side walls and the surrounding particles which define the capillaries holding the fluid and thereby creates noise with the flow. A substantially large and smooth walled conduit will create little noise. By contrast, a formation where the capillaries may be described as more serpentine or irregular in shape will create acoustic noise. Thus, a formation with relatively poor permeability will create more noise than a formation which is highly permeable. The noise is heard by the listening device 42 and supplied through an amplification system filtering and recorded. The noise levels and frequency content are related to formation permeability. A standard for a formation of known permeability is established whereupon the logging device and system presently disclosed can then be used for formations of unknown permeability.

The theory of operation of the present invention is believed to relate to the electrokinetic movement of the fluids in the formation. Considering the fluid in the formation as comprised of individual magnetic dipoles, which are at least partly free to move in the fluid solution, each dipole is able to respond to the magnetic field acting on it. It responds by tending to move. When it is subjected to two fields which interact with it, movement on a molecular scale occurs. This movement is more orderly than Brownian movement or thermal agitation present at any temperature level of practical consideration. The movement is disbursed at all points in the fluid in the formation which experiences the electric and magnetic fields acting on the formation. Of necessity the electric and magnetic fields are not uniform in strength, but this is of no particular consequence. Impingement of the electric and magnetic fields on the formation fluids imparts electrokinetic energy to the molecules which causes, it is believed, the localized increase in formation fluid pressure which results in fluid movement in a more or less random manner. Since the fluid is captured in the interstical spaces of the formation, its movement is miniscule, random, and highly dependent on the physical arrangement of the formation. This is of no particular consequence because the movement is accompanied by noise occurring with the flow.

The foregoing is directed to the preferred embodiment of the present invention, the scope of which is determined by the claims which are appended hereto.

We claim:

1. A method for measuring permeability of a formation adjacent to a borehole comprising the steps of:
   forming essentially stable constant magnetic flux lines in a localized region in a formation of interest;
   forming direct electric current flow paths in the same localized region of the formation at substantially right angles to said magnetic flux lines; and
   listening to the noise of fluid movement in the formation to obtain an indication of formation permeability.

2. The method of claim 1 wherein a magnet having a pair of spaced magnetic poles is placed substantially against the borehole wall.

3. The method of claim 1 wherein a magnet having a pair of spaced poles is positioned adjacent to the formation and a direct current injection electrode is positioned between the poles to form the direct electric current flow paths.

4. The method of claim 1 wherein said listening step occurs simultaneously with formation of the lines and paths.

5. The method of claim 4 wherein the noise is amplified and filtered.

6. The method of claim 5 wherein the noise is recorded after amplification.

7. The method of claim 1 wherein a ground electrode is placed elsewhere and an injection electrode forms the direct electric current flow paths.

8. The method of claim 1 wherein the magnetic flux lines and direct electric current flow paths are formed prior to listening for the noise of fluid movement.

9. An apparatus for measuring permeability of a formation adjacent to a borehole, comprising:
   a tool adapted to be lowered into a well bore to a selected depth;
   means carried thereon for forming substantially constant magnetic flux lines in a localized region in a formation adjacent to the well bore;
   means carried on said tool for forming a direct electric current flow path in the same localized region of the formation;
   listening means for listening to the noise of fluid movement in the formation of interest; and,
   indicating means connected to said listening means for providing an indication of formation permeability.

10. The apparatus of claim 9 including means for lowering the tool to a selected depth in a well bore.

11. The apparatus of claim 9 including a return ground electrode adapted to complete a circuit with said means for forming a direct electric current flow in the formation.

12. The apparatus of claim 9 wherein said tool carried magnetic means having a pair of spaced magnetic poles adapted to be placed against the borehole wall.

13. The apparatus of claim 11 wherein said tool carries a direct current injection electrode positioned between the poles of a magnet means.

14. The apparatus of claim 9 including a filter means connected between said listening means and said indicating means.

* * * * *